United States Patent
Nugent et al.

(10) Patent No.: US 9,285,252 B1
(45) Date of Patent: Mar. 15, 2016

(54) SENSOR AND HOUSING SUITABLE FOR HARSH ENVIRONMENTS

(71) Applicant: Ultra Electronics, Round Rock, TX (US)

(72) Inventors: Angela Nugent, Austin, TX (US); Todd Allen, Austin, TX (US); Todd Reynolds, Pflugerville, TX (US)

(73) Assignee: ULTRA ELECTRONICS, Round Rock, TX (US)

( * ) Notice: Subject to any disclaimer, the term of this patent is extended or adjusted under 35 U.S.C. 154(b) by 0 days.

(21) Appl. No.: 14/509,841

(22) Filed: Oct. 8, 2014

(51) Int. Cl.
*G01D 11/24* (2006.01)

(52) U.S. Cl.
CPC .................................. *G01D 11/245* (2013.01)

(58) Field of Classification Search
CPC ............................ G01D 11/24; G01D 11/245
USPC ........................................................... 73/431
See application file for complete search history.

(56) References Cited

U.S. PATENT DOCUMENTS

| | | | |
|---|---|---|---|
| 2,332,354 A | 10/1943 | Stecher | |
| 2,768,846 A | 10/1956 | Gratzmuller | |
| 4,638,668 A | 1/1987 | Leverberg et al. | |
| 4,823,602 A | 4/1989 | Christensen, Jr. | |
| 4,877,270 A * | 10/1989 | Phillips | F16L 49/06 285/18 |
| 5,746,454 A * | 5/1998 | Webb | F16L 39/005 285/123.12 |
| 5,827,985 A | 10/1998 | Grieger et al. | |
| 5,927,762 A | 7/1999 | Webb | |
| 7,465,086 B1 | 12/2008 | Foreman, Jr. | |
| 8,051,712 B2 | 11/2011 | Younsi et al. | |
| 8,266,960 B2 | 9/2012 | Braman et al. | |
| 2012/0186370 A1 | 7/2012 | Auerswald et al. | |
| 2014/0109700 A1 | 4/2014 | Yltchev-Edelmann et al. | |

FOREIGN PATENT DOCUMENTS

CN 103383287 A 11/2013

* cited by examiner

*Primary Examiner* — Lisa Caputo
*Assistant Examiner* — Jamel Williams
(74) *Attorney, Agent, or Firm* — Brian F. Russell; Russell Ng PLLC

(57) ABSTRACT

A sensor and housing suitable for harsh environments includes a central axis and first and second housing sections. The first housing section includes a first fitting including a mating surface orthogonal to the axis and a tapered recess formed in the mating surface and coaxial with the axis. The tapered recess has a decreasing internal dimension at points further from the mating surface and terminates at a faceted recess. The second housing section includes a second fitting having a flange and a frusto-conical projection terminating in a faceted tip. When the first and second housing are coupled, the flange and mating surface are aligned, the frusto-conical projection contacts an interior surface of the first fitting that defines the tapered recess, and the faceted tip seats within the faceted recess. The housing may include a head for housing sensor electronics and a shield that encloses the head and is spaced from the head by an air gap.

20 Claims, 7 Drawing Sheets

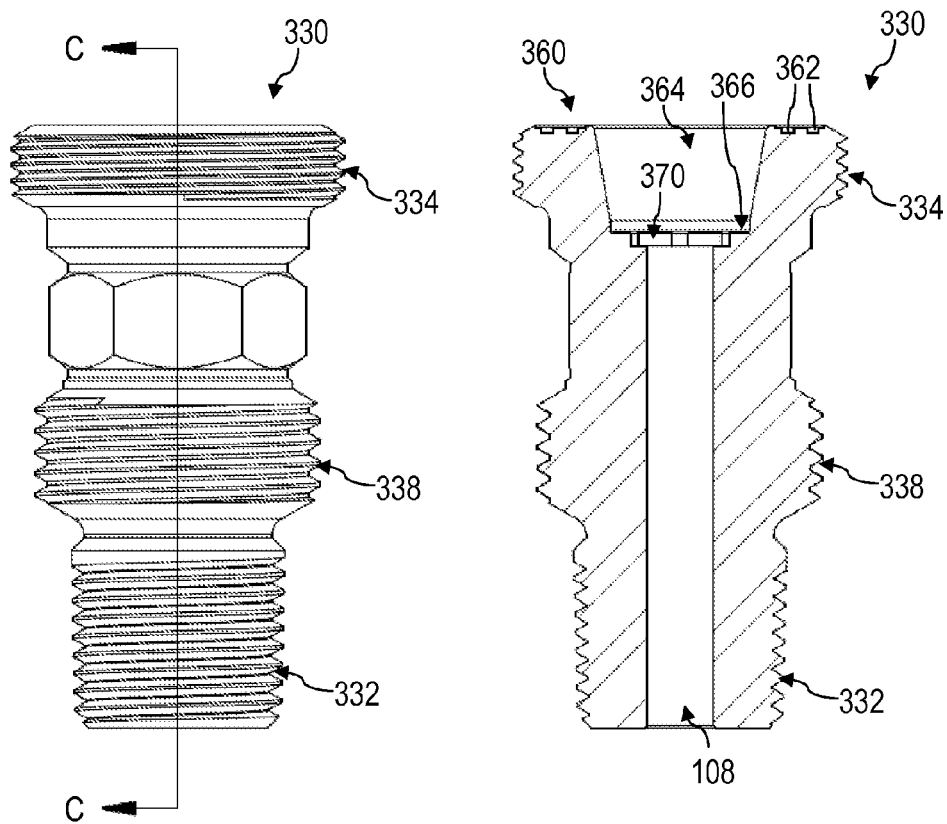
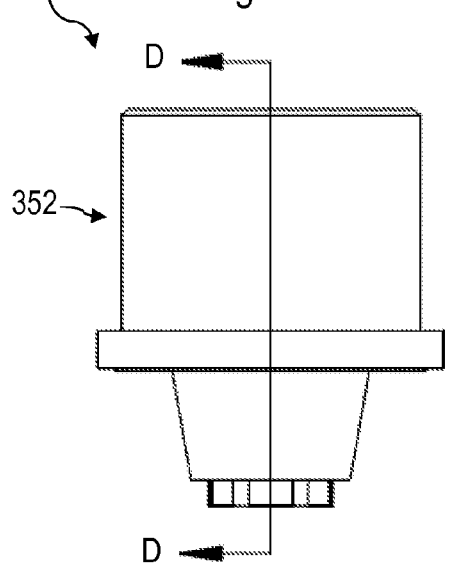
Fig. 4A Fig. 4B
Fig. 5A Fig. 5B

SENSOR AND HOUSING SUITABLE FOR HARSH ENVIRONMENTS

BACKGROUND OF THE INVENTION

The present invention relates to environmental sensors, and more specifically, to environmental sensors and housings suitable for harsh environments.

Harsh environments, such as those present in power plants, salt water environments, outer space, and some manufacturing facilities, require ruggedized sensors in order to reliably sense environmental parameters, such as temperature, pressure, position and the like. In these harsh environments, sensors may fail due to temperature extremes, radiation, corrosion, vibration, and/or other environmental conditions.

BRIEF SUMMARY

To reduce the incidence of sensor failure, a sensor and sensor housing suitable for use in harsh environments are provided.

In some embodiments, a housing includes an elongate body having a central axis and at least a first housing section and a second housing section. The first housing section includes a first fitting including a mating surface orthogonal to the axis and a tapered recess formed in the mating surface and coaxial with the axis. The tapered recess has a decreasing internal dimension at points further from the mating surface and terminates at a faceted recess. The second housing section includes a second fitting having a flange and a frusto-conical projection terminating in a faceted tip. When the first housing is coupled to the second housing by a coupling element, the flange and mating surface are aligned, the frusto-conical projection contacts an interior surface of the first fitting that defines the tapered recess, and the faceted tip seats within the faceted recess.

In at least some embodiments, a housing includes an elongate body having a central axis and including at least a first housing section and a second housing section. The first housing section includes a first mating surface surrounding an internally threaded axially aligned recess. The second housing section includes a stem, including an end having first external threads configured to mate with those of the internally threaded recess and second external threads spaced from the end. The second housing section further includes a coupling element including a through hole having internal threads configured to engage the second external threads and further including a second mating surface that buttresses the stem against the first mating surface.

In some embodiments, the housing includes a head housing section including a head comprising an enclosure for housing sensor electronics. The head housing section further includes a shield that encloses the head and that is spaced from the head by an air gap.

BRIEF DESCRIPTION OF THE SEVERAL VIEWS OF THE DRAWINGS

FIG. 4A is a detailed elevation view of the stem of the sensor of FIGS. 3A-3D;

FIG. 4B is a section view of the stem of FIG. 4A along line C-C;

FIG. 5A is a detailed elevation view of an anti-vibration fitting of the sensor of FIGS. 3A-3D;

FIG. 5B is a section view of the fitting of FIG. 5A along line D-D; and

In the figures, like and corresponding features are identified by like and corresponding reference numerals.

DETAILED DESCRIPTION

Figure 1A:
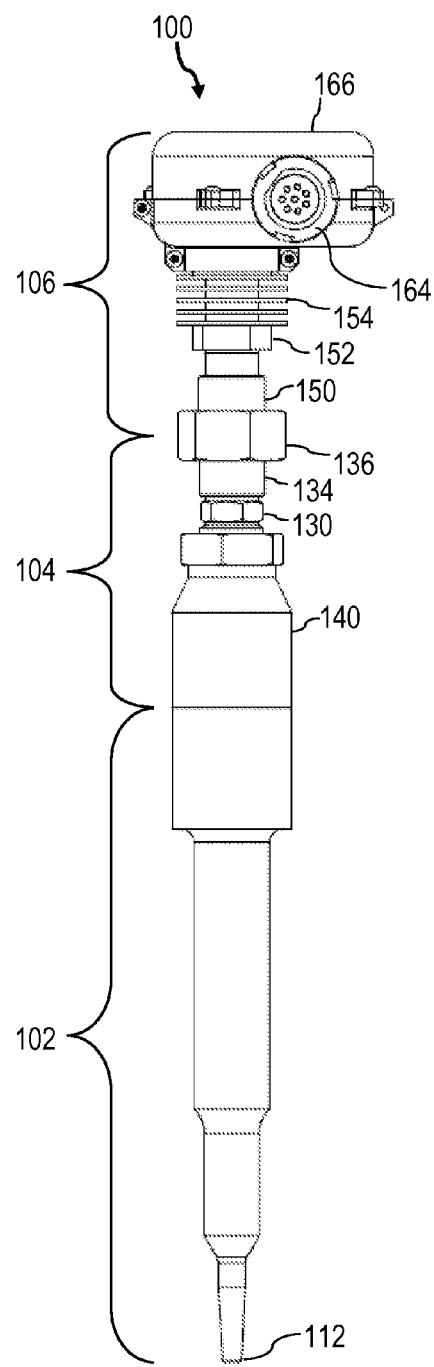
FIG. 1A is a first elevation view of a sensor for harsh environments in accordance with a first embodiment.
Figure 1B:
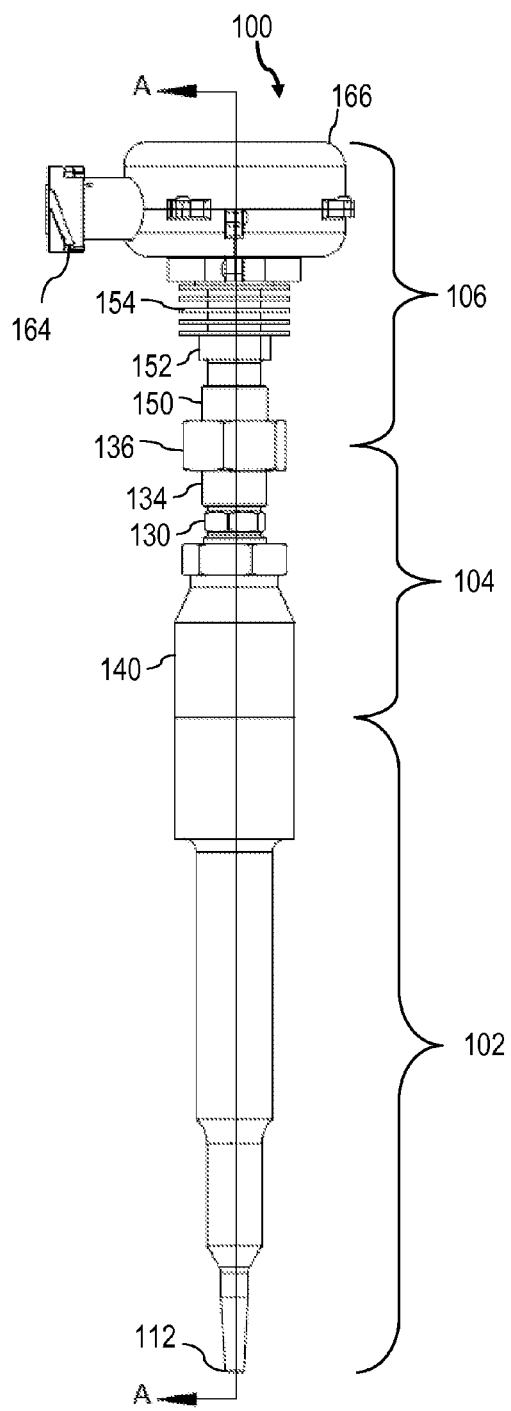
FIG. 1B is a second elevation view of the sensor of FIG. 1A.
Figure 1C:
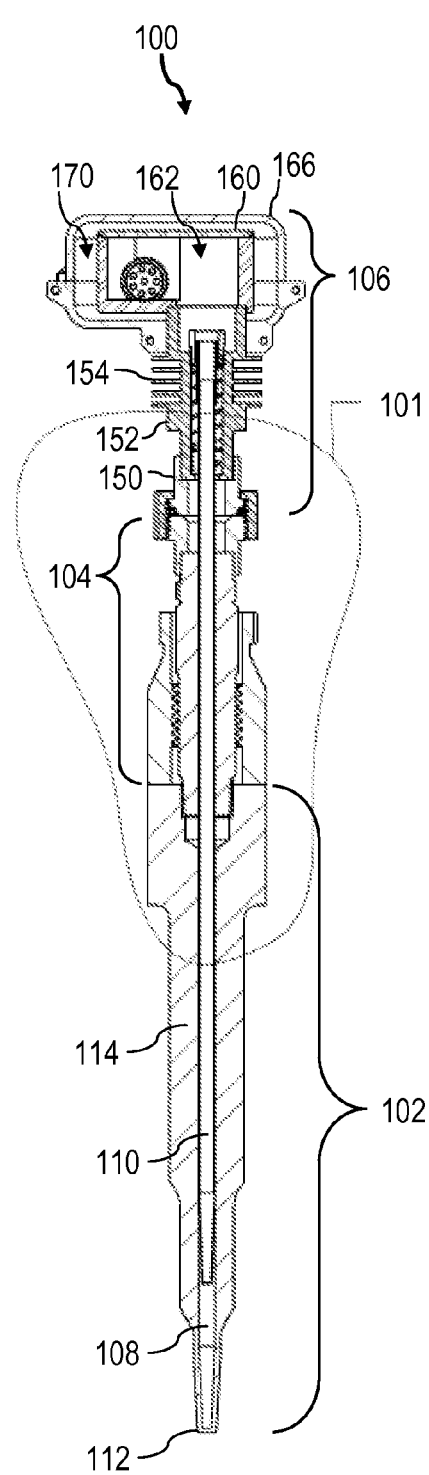
FIG. 1C is a section view of the sensor of FIG. 1B along line A-A.
Figure 1D:
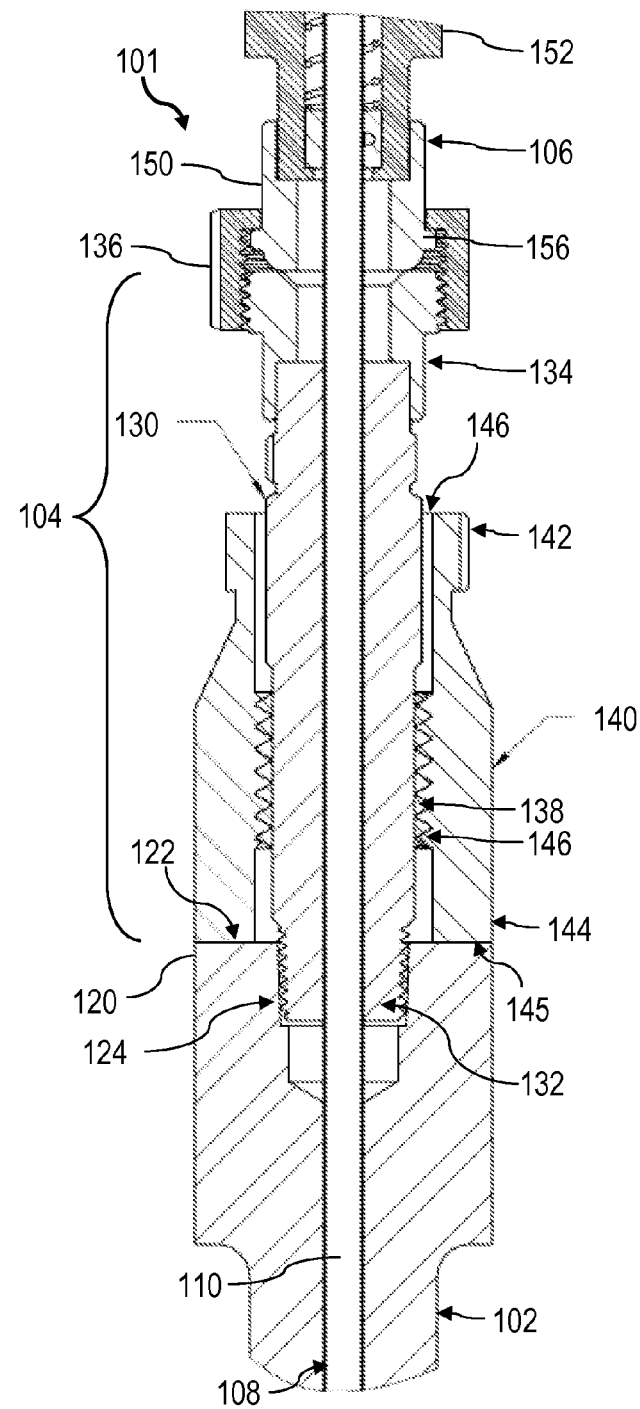
FIG. 1D is a detailed section view of a portion of the sensor of FIG. 1C.

With reference now to the figures and with particular reference to FIGS. 1A-1D, first and second elevation views and first and second section views of a sensor 100 for harsh environments in accordance with a first embodiment are respectively illustrated. The first and second section views of sensor 100 given in FIGS. 1C-1D are taken along line A-A of FIG. 1B, and the second section view given in FIG. 1D provides a more detailed view of portion 101 from FIG. 1C.

In the illustrated example, sensor 100, which is configured as a temperature sensor, has a generally elongate form extending along a central axis illustrated by line A-A. Sensor 100 includes a multi-part body formed of a lower housing section 102, a core housing section 104, and a head housing section 106. Lower housing section 102 and core housing section 104 are preferably formed of a durable material, such as stainless steel or other metal or metal alloy, selected for its suitability for resisting degradation in its environment, while supporting sensing of the environmental parameter for which sensor 100 is adapted.

In the depicted temperature-sensing embodiment, sensor 100 is configured for at least a portion of lower housing section to be inserted through an opening into a conduit, a vessel or other space to sense the temperature of the fluid or other material therein. To this end, head housing section 106, core housing section 104 and lower housing section 102 have formed therein a central axially aligned bore 108 that tightly receives therein a sensing element 110, which can be formed, for example, of a metal or metal alloy having a high thermal conductivity (e.g., greater than 100 watts per meter per Kelvin). Sensing element 110 preferably makes surface contact with the interior surface of bore 108, especially toward the extremity or distal end 112 of lower housing section 102, to promote thermal conductivity between the external environment and sensing element 110. As best seen in FIG. 1C, the thickness of sidewall 114 of lower housing section 102 surrounding bore 108 optionally but preferably tapers toward distal end 112 of lower housing section 102, either gradually or in steps as shown in FIGS. 1A-1C, to further promote thermal conductivity between the external environment and sensing element 110. In various embodiments, sensing element 110 may, but need not, extend to the end of bore 108 where the thickness of sidewall 114 is at a minimum.

Still referring to FIGS. 1A-1D, lower housing section 102 terminates at its proximal end 120 in a planar mating surface 122, which is orthogonal to the central axis of sensor 100 and has an axially aligned recess 124 formed therein. Axially aligned recess 124 is at least partially internally threaded and is sized to receive therein and mate with an externally threaded first end 132 of a stem 130 forming a portion of core housing section 104. At its second end, stem 130 is coupled to (e.g., welded to) or integral with a fitting 134, which in the depicted embodiment comprises a pipe section having an external thread sized and configured to be coupled to head housing section 106 by a coupling element, such as threaded lock nut 136. Intermediate first end 132 and fitting 134 and spaced from both along the length of stem 130 are external threads 138. Although not required, in the depicted embodiment, stem 130 has a larger outer diameter measured orthogonally to axis A-A at external threads 138 than at first end 132.

To improve the vibration resistance of the coupling between lower housing section 102 and core housing section 104, core housing section 104 further includes an additional coupling element, such as locking collar 140. In the illustrated embodiment, locking collar 140 has a body including an upper end 142 and a lower end 144 that terminates in a planar mating surface 145, which is orthogonal to the central axis of locking collar 140. Locking collar 140 further includes a central, axially aligned through hole 146 sized to slidably receive there through the first end 132 of stem 130, which, when assembled with locking collar 140, passes first through upper end 142 and then out of lower end 144 of locking collar 140. To enable secure connection of locking collar 140 to stem 130, locking collar 140 further includes within through hole 146 interior threads that are disposed between and spaced from upper end 142 and lower end 144 and that are configured to mate with external threads 138 of stem 130. When stem 130 is assembled to lower housing section 102 and threads 138 and 146 are fully engaged as illustrated, planar mating surfaces 122 and 145 solidly contact, and the portion of locking collar 140 extending between threads 146 and lower end 144 buttresses the connections between threads 138 and 146 and between the threads of axial recess 124 and first end 132, thus increasing the resistance of the coupling between core housing section 104 and lower housing section 102 to vibration-induced decoupling.

As best seen in FIG. 1D, head housing section 106 includes a fitting 150 that is integral to (or in the depicted embodiment, welded to) a neck 152 having an integral heat sink including a plurality of fins 154 that dissipate heat conducted to neck 152 from lower housing section 102 and core housing section 104. In the illustrated example, fitting 150 is an unthreaded pipe section having a hollow interior for receiving sensing element 110 there through and a circumferential flange 156, which captures lock nut 136 on head housing section 106 and against which lock nut 136 can be tightened. As best seen in FIG. 1C, a head 160 comprising an enclosure having an interior volume 162 for housing sensor electronics (unillustrated) is coupled to neck 152. As will be appreciated by those skilled in art, the sensor electronics will vary between applications, but are typically coupled to sensing element 110 and transform a raw quantity sensed by sensing element 110 into a signal (e.g., a electrical signal, an optical signal, a radio frequency signal, etc.) that can be communicated to a centralized data collection and/or control point. In the depicted embodiment, sensor 100 supports communication of electrical signals via a conventional connector 164.

Figure 2:
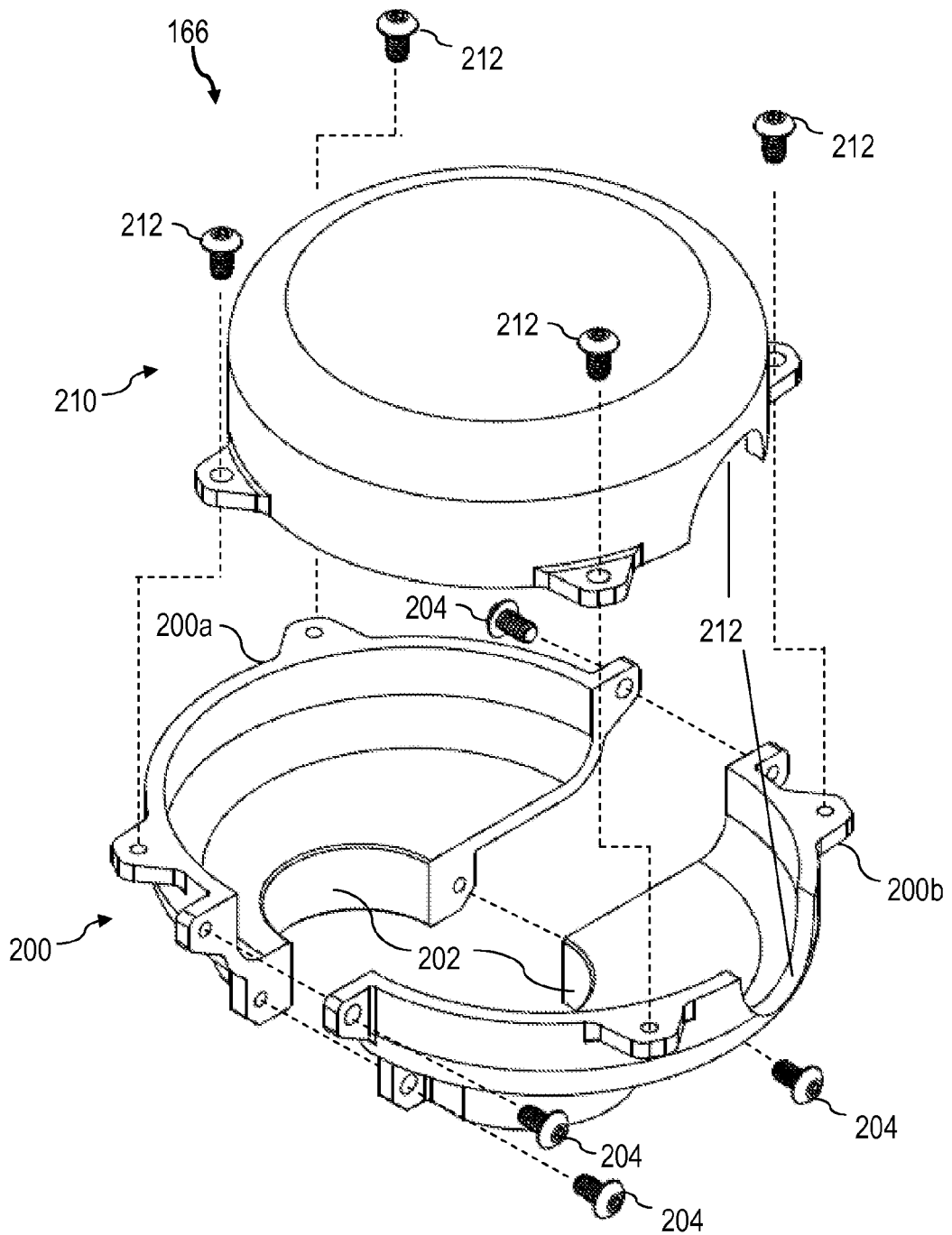
FIG. 2 is an exploded view of a shield of a sensor in accordance with one embodiment.

Because the sensor electronics housed within interior volume 162 of head 160 can be sensitive to (and/or damaged by) high temperatures, high temperature gradients, radiation, and/or other environmental characteristics, head housing section 106 may optionally further include a shield 166, one embodiment of which is depicted in greater detail in FIG. 2. In this embodiment, shield 166, which may be formed, for example, of stainless steel, includes a two-piece bottom plate 200 including a first bottom plate section 200a and a second bottom plate section 200b. Each of first bottom plate section 200a and second bottom plate section 200b has a first arcuate recess 202 formed therein that is sized such that bottom plate 200 can be assembled tightly about neck 152, for example, utilizing screws 204. Shield 166 further includes a top plate 210 that can be coupled and decoupled from bottom plate 200, for example, utilizing screws 212. In the depicted embodiment, top plate 210 and second bottom plate section 200b each have a second arcuate recess 212 formed therein, so that top plate 210 and second bottom plate section 200b can be tightly assembled about connector 164. As best seen in FIG. 1C, shield 166 is preferably sized such that head 160 and shield 166 are spaced by a gap 170. In various embodiments, gap 170 may be filled with a selected substance, such as air, that is selected to increase the resistance of head 160 to damage from heat gradients and/or other characteristics of the environment surrounding shield 166. For example in one embodiment in which head 160 is to be protected from rapidly rising temperatures, gap 170 is between 0.1 inches and 0.5 inches and, more preferably, between 0.1 and 0.4 inches on each side of head 160.

Figure 3A:
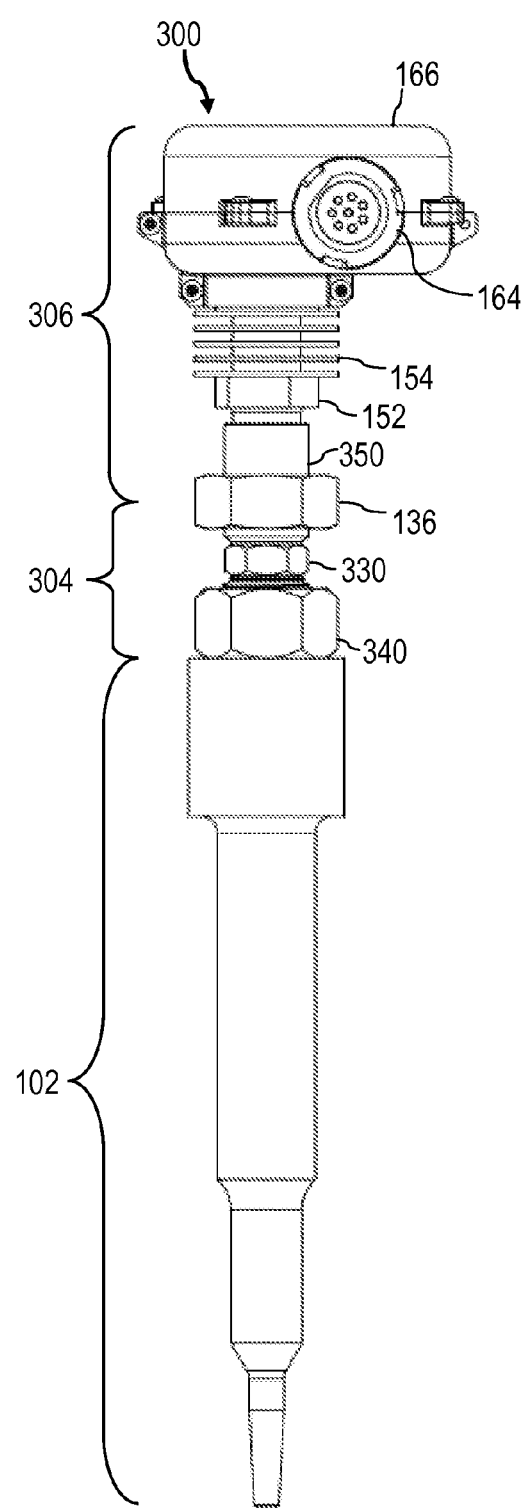
FIG. 3A is a first elevation view of a sensor for harsh environments in accordance with a second embodiment.
Figure 3B:
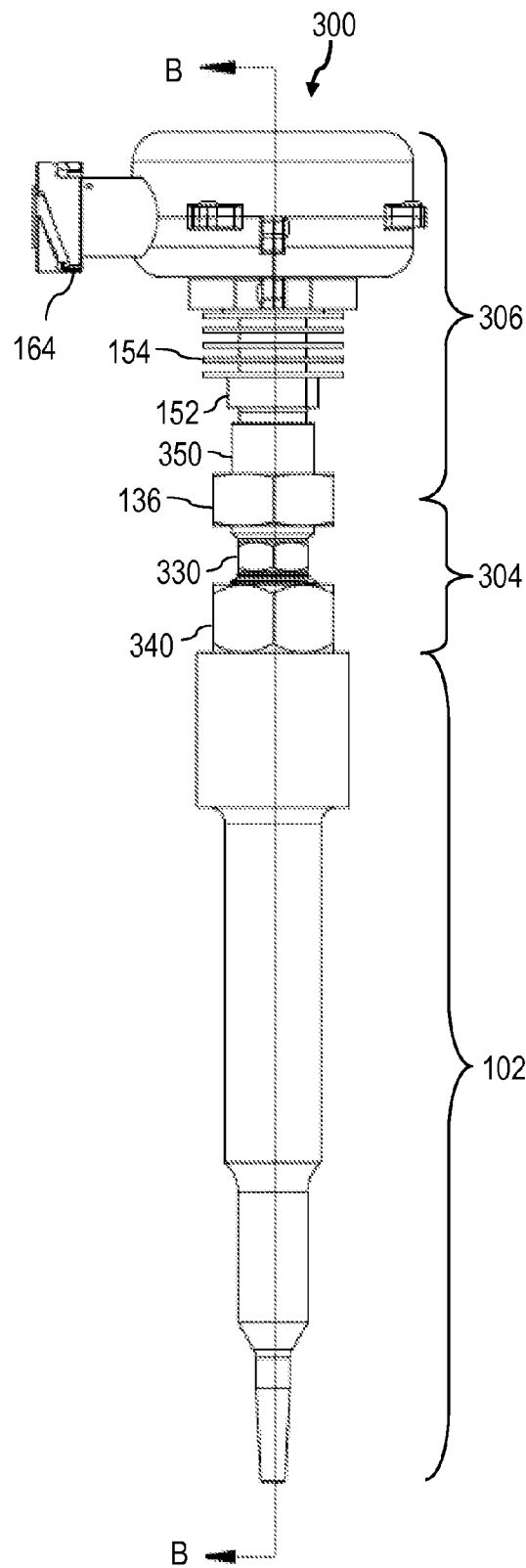
FIG. 3B is a second elevation view of the sensor of FIG. 3A.
Figure 3C:
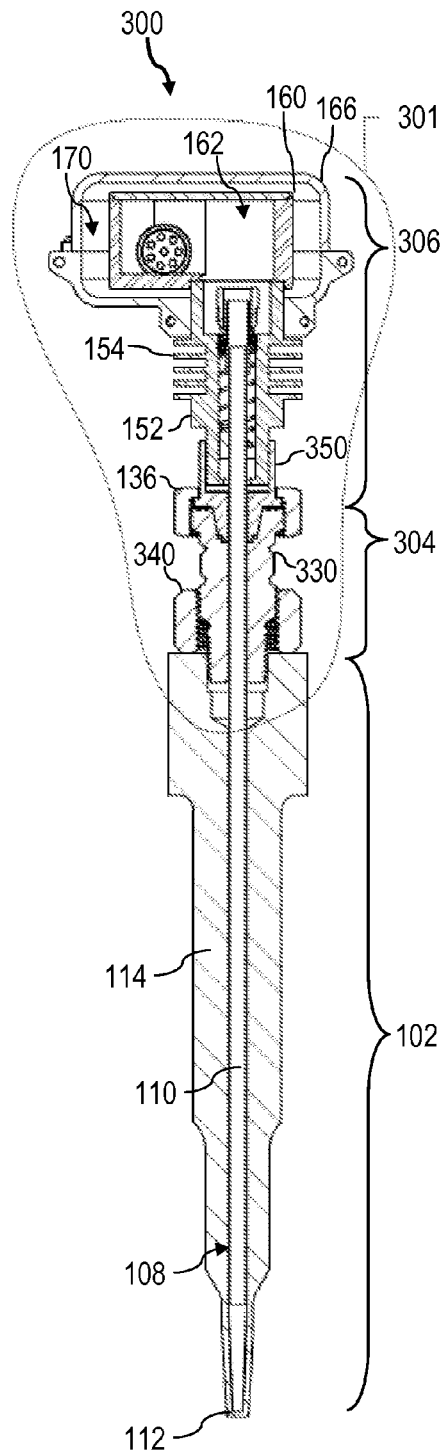
FIG. 3C is a section view of the sensor of FIG. 3B along line B-B.
Figure 3D:
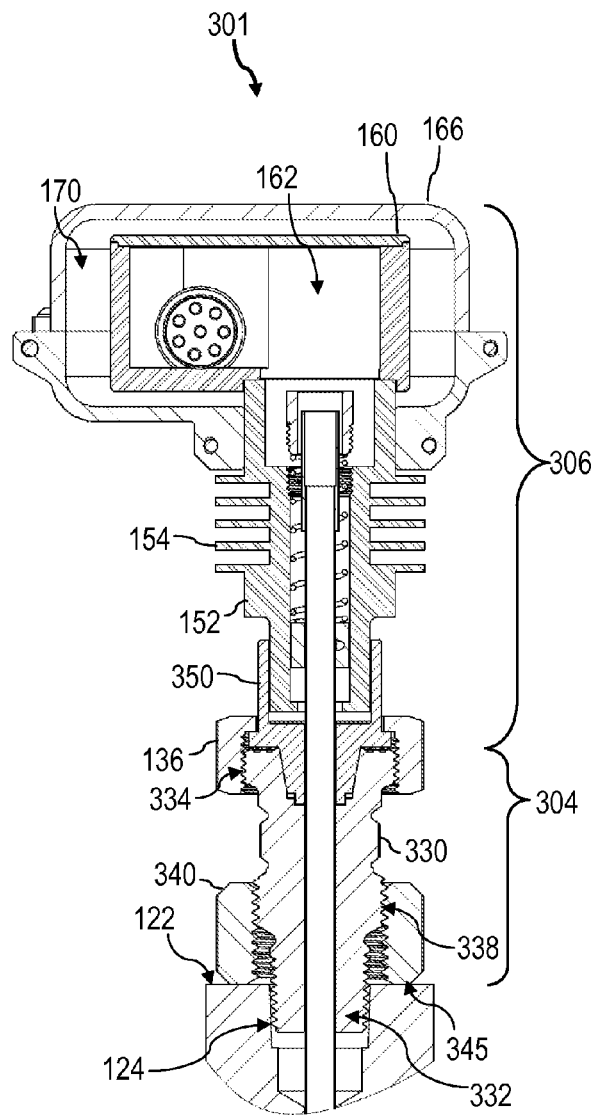
FIG. 3D is a detailed section view of a portion of the sensor of FIG. 3C.

Referring now to FIGS. 3A-3D, first and second elevation views, an overall section view, and a detailed section view of a sensor 300 for harsh environments in accordance with a second embodiment are respectively illustrated. The section views given in FIGS. 3C-3D are taken along line B-B of FIG. 3B, and the section view of FIG. 3D illustrates in greater detail portion 301 of FIG. 3C. As can be seen by comparison of FIGS. 3A-3D and FIGS. 1A-1D, sensor 300 is designed to be more compact along its long axis (illustrated by line B-B) than sensor 100 of FIGS. 1A-1D and therefore includes a significantly shorter core housing section 304 than core housing section 104 of sensor 100.

As indicated by like reference numerals, sensor 300 includes a lower housing section 102 as described above with reference to FIGS. 1A-1D. As noted above, axially aligned recess 124 of lower housing section 102 is at least partially internally threaded. Axially aligned recess 124 of lower housing section 102 is sized to receive therein and mate with an externally threaded first end 332 of a stem 330 forming a portion of core housing section 304. At its second end, stem 130 is or integral with (or welded to) a fitting 334, which in the depicted embodiment comprises a flared pipe section having an external thread sized and configured to be coupled to head housing section 106 by a coupling element, such as threaded lock nut 136 (as described further below). Intermediate first end 332 and fitting 334 and spaced from both along the length of stem 330 are external threads 338. Although not required, in the depicted embodiment, stem 330 has a larger diameter measured orthogonally to axis B-B at external threads 338 than at first end 332.

As shown in the elevation view of FIG. 4A and the section view along line C-C given in FIG. 4B, fitting 334 of stem 330 has a mating surface 360 that is orthogonal to the central axis of stem 330 and surrounds the periphery of central bore 108. In at least some embodiments, mating surface 360 has one or more (and in the depicted example, two) channels 362 formed therein concentrically surrounding central bore 108. Fitting 334 further includes a tapered recess 364 that is coaxial with central bore 108. Tapered recess 364 has an internal diameter that continuously decreases from mating surface 360 to a shoulder 366 that abuts the periphery of the base of tapered recess 364. Interior to shoulder 366, a further shallow faceted recess 370 is formed. Faceted recess 370 preferably has a polygonal cross-section including at least three facets or sides, and in common embodiments, may include four, six or eight facets.

To provide vibration resistance for the coupling between lower housing section 102 and core housing section 304, core housing section 304 further includes a coupling element, such as lock nut 340. In the illustrated embodiment, lock nut 340 has a threaded central bore and a lower mating surface 345, which is orthogonal to the central axis of lock nut 340. As best seen in FIG. 3D, the interior threads of lock nut 340 are configured to mate with external threads 338 of stem 330 when first end 332 of stem 330 is assembled to lower housing section 102 and planar mating surfaces 122 and 345 solidly contact. The portion of lock nut 340 extending between threads 338 and mating surface 345 buttresses the threaded connections between lock nut 340 and external threads 338 and between axially aligned recess 124 and first end 332, increasing the resistance of the coupling between core housing section 304 and lower housing section 102 to vibration-induced decoupling.

In the depicted embodiment, the coupling between core housing section 304 and head housing section 306 is also configured to resist vibration-induced decoupling. In particular, head housing section 306, which can otherwise be configured like head housing section 106 described above, includes a specially configured fitting 350 that can be welded to (as shown) or integral to neck 152 of head housing section 306. As shown in the elevation view of FIG. 5A and the section view along line D-D given in FIG. 5B, in embodiments in which fitting 350 is welded to neck 152, fitting 350 includes a cup section 352 having a recess 353 that receives and is welded about one end of neck 152. Fitting 350 further includes a seat section 354 including a flange 355 that is sized and configured to correspond with mating surface 360 and a substantially frusto-conical projection 356 that terminates in a faceted tip 358. The lower surface 359 of flange 355 corresponding to mating surface 360 may optionally include one or more circular ridges 357 projecting therefrom at radial positions corresponding to those of the one or more channels 362 on mating surface 360.

Figure 6:
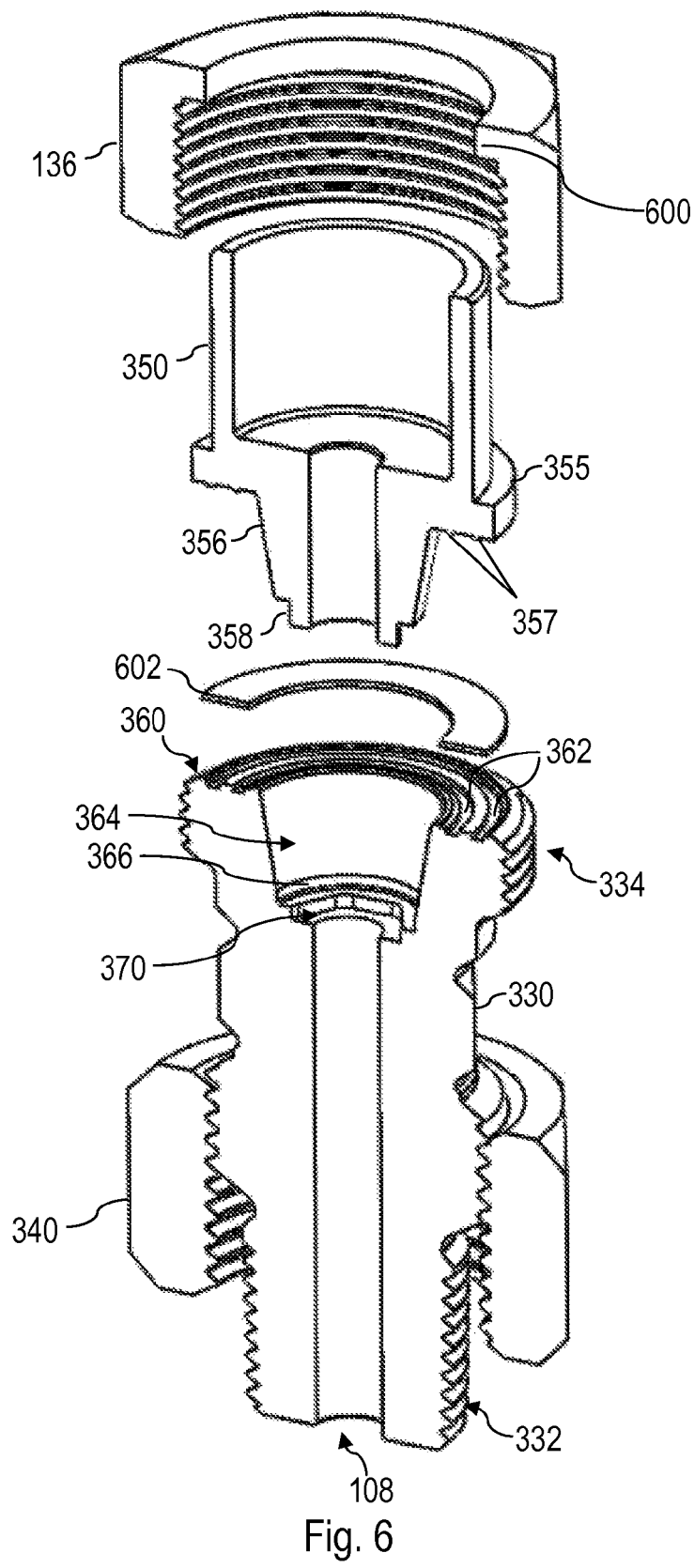
FIG. 6 is a partially exploded cutaway view of an anti-vibration coupling in accordance with one embodiment.

FIG. 6 is a partially exploded cutaway view of the vibration-resistant connection between fitting 350 of head housing section 306 and core housing section 304. As shown in FIG. 6 and FIG. 3D, when the internal threads of lock nut 136 are coupled to the external threads of fitting 334 of stem 330, flange 600 of lock nut 136 engages flange 355 of fitting 350, driving lower surface 359 and ridges 357 toward corresponding channels 362 in mating surface 360. In some embodiments, the corresponding ridges 357 and channels 362 simply interlock. In other embodiments, such as that shown, corresponding ridges 357 and channels 362 contact and deform a washer 602 interposed between lower surface 359 of flange 355 and mating surface 360. In this manner, washer 602, which may advantageously be formed of brass or other metal or metal alloy that is relatively malleable as compared to the stainless steel or other material selected for fitting 350 and stem 330, establishes a seal at the radially interior circumference and radially exterior circumference of each channel 362.

Further, when fitting 350 is connected to fitting 334 by lock nut 136, frusto-conical projection 356 of fitting 350 snugly seats within and contacts the interior surface of tapered recess 364 and faceted tip 358 seats within faceted recess 370. Contact between the corresponding surfaces of faceted tip 358 and faceted recess 364 prevent rotation of head housing section 306 and core housing section 304 relative to one another once coupled by lock nut 136. However, the multiple facets of faceted tip 358 and faceted recess 364 enable head housing section 306 and core housing section 304 to be assembled with any of multiple relative angular orientations predetermined by the facets.

As has been described, in some embodiments, a sensor housing includes an elongate body having a central axis and at least a first housing section and a second housing section. The first housing section includes a first fitting including a mating surface orthogonal to the axis and a tapered recess formed in the mating surface and coaxial with the axis. The tapered recess has a decreasing internal dimension at points further from the mating surface and terminates at a faceted recess. The second housing section includes a second fitting having a flange and a frusto-conical projection terminating in a faceted tip. When the first housing is coupled to the second housing by a coupling element, the flange and mating surface are aligned, the frusto-conical projection contacts an interior surface of the first fitting that defines the tapered recess, and the faceted tip seats within the faceted recess.

In at least some embodiments, a housing includes an elongate body having a central axis and including at least a first housing section and a second housing section. The first housing section includes a first mating surface surrounding an internally threaded axially aligned recess. The second housing section includes a stem, including an end having first external threads configured to mate with those of the internally threaded recess and second external threads spaced from the end. The second housing section further includes a coupling element including a through hole having internal threads configured to engage the second external threads and further including a second mating surface that buttresses the stem against the first mating surface.

In some embodiments, the housing includes a head housing section including a head comprising an enclosure for housing sensor electronics. The head housing section further includes a shield that encloses the head and that is spaced from the head by an air gap.

While the present invention has been particularly shown as described with reference to one or more preferred embodiments, it will be understood by those skilled in the art that various changes in form and detail may be made therein without departing from the spirit and scope of the invention. For example, the use of the terms "upper" and "lower" herein is intended to facilitate description of the invention given the relative orientations and positions of elements as illustrated in the figures and is not intended to limit applicability of the appended claims to embodiments or installations in which the elements have differing relative orientations or positions. Further, it will be appreciated by those skilled in the art that in some embodiments, elements of the couplings between housing sections can be reversed. By way of example rather than limitation, in an alternative embodiment fitting 350 can form a portion of core housing section 304, and fitting 334 can form a portion of head housing section 306. Similarly, in an alternative embodiment, fitting 350 can have external threads, fitting 334 can be unthreaded, and lock nut 136 can couple fittings 350 and 334 by engaging the external threads of fitting 350. Further, it should be appreciated that in some embodiments, the different couplings shown in the first and second embodiments can be employed in combination.

What is claimed is:

1. A housing, comprising:
an elongate body having a central axis, wherein the body includes at least a first housing section and a second housing section, wherein:

the first housing section includes a first fitting including a mating surface orthogonal to the axis and a tapered recess formed in the mating surface and coaxial with the axis, wherein the tapered recess has a decreasing internal dimension at points further from the mating surface and terminates at a faceted recess;

the second housing section includes a second fitting having a flange and a frusto-conical projection terminating in a faceted tip, wherein, when the first housing is coupled to the second housing, the flange and mating surface are aligned, the frusto-conical projection contacts an interior surface of the first fitting that defines the tapered recess, and the faceted tip seats within the faceted recess; and a coupling element that couples the first and second fittings.

2. The housing of claim 1, wherein:
at least one of the first and second housing sections has an external thread; and
the coupling element comprises a nut.

3. The housing of claim 1, wherein the mating surface of the first fitting has one or more channels formed therein that are concentric about the axis.

4. The housing of claim 3, wherein the flange includes one or more ridges at locations corresponding to the one or more channels.

5. The housing of claim 4, wherein the sensor housing further includes a washer disposed between the flange and the mating surface.

6. A sensor, comprising:
the housing of claim 1, wherein the housing has an axially aligned bore; and
a sensing element housed within the bore.

7. The housing of claim 1, wherein:
one of the first and second housing sections comprises a head housing section including a head comprising an enclosure for housing sensor electronics; and
the head housing section further includes a shield that encloses the head and that is spaced from the head by an air gap.

8. The housing of claim 7, wherein the head and the shield are formed of steel.

9. The housing of claim 8, wherein the shield includes at least two separable sections.

10. The housing of claim 1, wherein:
the mating surface comprises a first mating surface;
the sensor housing further comprises a third housing section including a second mating surface surrounding an internally threaded recess;
one of a set including the first and second housing sections includes a stem includes an end having first external threads configured to mate with those of the internally threaded recess and second external threads spaced from the end; and
a locking nut including a through hole having internal threads configured to engage the second external threads and further including a third mating surface that buttresses the stem against the second mating surface.

11. A housing, comprising:
an elongate body having a central axis and including at least a first housing section and a second housing section, wherein:

the first housing section includes a first mating surface surrounding an internally threaded axially aligned recess;

the second housing section includes a stem, the stem including an end having first external threads configured to mate with those of the internally threaded recess and second external threads spaced from the end; and the second housing section further includes a coupling element including a through hole having internal threads configured to engage the second external threads and further including a second mating surface that buttresses the stem against the first mating surface.

12. The housing of claim 11, wherein the coupling element comprises one of a set including a locking nut and a locking collar.

13. A sensor, comprising:
the housing of claim 11, wherein the housing has an axially aligned bore; and
a sensing element housed within the bore.

14. The sensor of claim 13, wherein:
the body further comprises a head housing section coupled to the second housing section;
the head housing section includes:
a head including an enclosure for housing sensor electronics; and
a shield that encloses the head and that is spaced from the head by an air gap.

15. The sensor of claim 14, wherein the head and the shield are formed of steel.

16. The sensor housing of claim 14, wherein the shield includes at least two separable sections.

17. The housing of claim 11, wherein:
the body further includes a third housing section coupled to the second housing section;
a first one of the second housing section and the third housing section includes a first fitting including a mating surface orthogonal to the axis and a tapered recess formed in the mating surface and coaxial with the axis, wherein the tapered recess has a decreasing internal dimension at points further from the mating surface and terminates at a faceted recess;
a second one of the second housing section and the third housing section includes a second fitting having a flange and a frusto-conical projection terminating in a faceted tip, wherein, when the first housing is coupled to the second housing, the flange and mating surface are aligned, the frusto-conical projection contacts an interior surface of the first fitting that defines the tapered recess, and the faceted tip seats within the faceted recess; and
the housing further includes a coupling element that couples the first and second fittings.

18. The housing of claim 17, wherein the mating surface of the first fitting has one or more channels formed therein that are concentric about the axis.

19. The housing of claim 18, wherein the flange includes one or more ridges at locations corresponding to the one or more channels.

20. The housing of claim 19, wherein the sensor housing further includes a washer disposed between the flange and the mating surface.

* * * * *